United States Patent [19]
Sydansk

[11] Patent Number: 5,513,712
[45] Date of Patent: May 7, 1996

[54] POLYMER ENHANCED FOAM DRILLING FLUID

[75] Inventor: Robert D. Sydansk, Littleton, Colo.

[73] Assignee: Marathon Oil Company, Findlay, Ohio

[21] Appl. No.: 364,588

[22] Filed: Dec. 27, 1994

Related U.S. Application Data

[63] Continuation-in-part of Ser. No. 336,150, Nov. 8, 1994.

[51] Int. Cl.$^6$ .......................... E21B 21/00; C09K 7/02; C09K 7/08
[52] U.S. Cl. .......................... 175/69; 175/65; 507/102; 507/120; 507/134; 507/135; 507/136
[58] Field of Search .......................... 17/65, 69, 71; 166/309; 507/102, 120

[56] References Cited

U.S. PATENT DOCUMENTS

| | | | |
|---|---|---|---|
| 3,630,286 | 12/1971 | Persinski | 166/309 |
| 3,738,437 | 6/1973 | Scheurman | 175/70 |
| 4,013,568 | 3/1977 | Fischer et al. | |
| 4,039,459 | 8/1977 | Fischer et al. | |
| 4,088,583 | 5/1978 | Pyle et al. | |
| 4,442,018 | 4/1984 | Rand | 507/102 |
| 5,129,457 | 7/1992 | Sydansk | 166/309 X |
| 5,307,878 | 5/1994 | Sydansk | 166/305.1 |
| 5,346,008 | 9/1994 | Sydansk | 166/274 |
| 5,358,046 | 10/1994 | Sydansk | 166/275 |
| 5,372,462 | 12/1994 | Sydansk | 405/264 |

FOREIGN PATENT DOCUMENTS 2099884  12/1982  United Kingdom.

OTHER PUBLICATIONS

Sheffield and Sitzman, "Air Drilling Practices in the Mid-continent and Rocky Mountain Areas", Mar. 6–Aug. 1985. SPE/IADC 13490.
Tufts, "Lost Circulation No Longer a Problem", *Canadian Petroleum*, pp. 19–21, Aug. 1983.
Ainley, "Development of Foam Fracturing and Cementing Fluids for Use in Tight Gas Sands", AICHE, Summer National Meeting, Aug. 28–31 1983.
"Economics and Technological Advances Promise to Unlock Vast Reserves", *Journal of Petroleum Technology*, pp. 81–84, Jan. 1982.

*Primary Examiner*—George A. Suchfield
*Attorney, Agent, or Firm*—Jack L. Hummel; Jack E. Ebel

[57] ABSTRACT

A process employing a polymer enhanced foam in a wellbore as a drilling fluid during a wellbore drilling operation. The polymer enhanced foam is formed from an uncrosslinked acrylamide polymer, a surfactant, an aqueous solvent, and an added gas.

11 Claims, 3 Drawing Sheets

POLYMER ENHANCED FOAM DRILLING FLUID

The present patent application is a CIP of U.S. Ser. No. 08/336,150.

BACKGROUND OF THE INVENTION

1. Technical Field

The present invention relates to a process for drilling into a subterranean formation for the recovery of hydrocarbons, and more particularly to a drilling process wherein a polymer enhanced foam is employed as the drilling fluid.

2. Description of Related Art

A drilling fluid is a specially designed fluid that is circulated through a wellbore as the wellbore is being drilled to facilitate the drilling operation. The circulation path of the drilling fluid typically extends from the surface wellhead down through the drill pipe string to the drilling face and back up through the annular space between the drill pipe string and wellbore face to the surface wellhead. The drilling fluid performs a number of functions as it circulates through the wellbore including cooling and lubricating the drill bit, removing drill cuttings from the wellbore, aiding in support of the drill pipe and drill bit, and providing a hydrostatic head to maintain the integrity of the wellbore walls and prevent well blowouts. The drilling fluid also desirably prevents sloughing and wellbore cave ins when drilling through water sensitive formations.

There are a number of conventional drilling fluids including compositions termed "drilling muds". Drilling muds comprise high-density dispersions of fine solids in an aqueous liquid or a hydrocarbon liquid. An exemplary drilling mud is a dispersion of clay and/or gypsum in water. The solid component of such a dispersion is termed a "weighting agent" and is designed to enhance the functional performance of the drilling fluid. Although high density fluids, such as drilling muds, perform satisfactorily in many subterranean applications, they are generally unsuitable where the hydrostatic pressure gradient of the drilling fluid is greater than the fracture or parting pressure gradient of the rock surrounding the wellbore. Under these conditions the drilling fluid undesirably parts or fractures the formation rock surrounding the wellbore enabling the drilling fluid to escape into the formation rock. Parting or fracturing the formation rock also undesirably enables fluids from the same formation being drilled or other formations in fluid communication therewith to more readily invade the wellbore. Even where the hydrostatic pressure gradient of the drilling fluid is less than the fracture or parting pressure gradient of the surrounding formation rock, the weight of the high-density drilling fluid column may, nevertheless, drive an undue volume of drilling fluid into the formation rock, particularly where the formation rock is sensitive to water invasion or where the reservoir has relatively low fluid pressure that does not effectively clean up the drilling fluid invading the reservoir, thereby inhibiting subsequent hydrocarbon production from the reservoir.

Accordingly, relatively intermediate-density or low-density compositions having corresponding intermediate or low hydrostatic pressure gradients are frequently employed as drilling fluids to obviate the above-described problems encountered with high-density, water-rich drilling fluids. Low-density drilling fluids include gasses, mists and foams. Of the gas drilling fluids, air or nitrogen is generally preferred. Mists consist of liquid particulates dispersed within a gas medium, while conventional foams consist of a gas dispersed by a foaming agent within a liquid medium. Certain gas-containing drilling fluids, termed "energized" drilling fluids, have specific utility in reservoirs having low fluid pressure, wherein the energized drilling fluid helps to clean up drilling fluids that have invaded the reservoir rock. Intermediate-density drilling fluids are typically clear aqueous liquids such as water, brines, polymer-containing brines or hydrocarbon-based drilling fluids.

Foams are oftentimes more effective than other types of low-density drilling fluids in removing materials from the drilling face to the surface of the wellbore. For example, U.S. Pat. No. 3,630,286 teaches a drilling process utilizing a specific foam composition for the removal of excess water from a wellbore being drilled wherein air is the initial drilling fluid. When water from the surrounding formation invades the wellbore, a foaming agent comprising a copolymer of acrylamide and diacetone acrylamide is injected into the wellbore and mixes with the excess water residing therein. The air circulating through the wellbore contacts the foaming agent and excess water creating a foam that is an effective drilling fluid for transporting the excess water from the wellbore to the surface wellhead.

Despite the apparent advantages of low-density foams over higher-density drilling fluids, conventional foams, nevertheless, do not always posses sufficient viscosity to adequately suspend and transport rock cuttings to the wellbore surface, thereby limiting their utility in many wellbore drilling operations. Conventional foams have also been known to perform inadequately when drilling through shales or to exhibit excessive lost circulation or relative instability under certain formation conditions. In particular, conventional foams often degrade when contacted by crude oil or when placed in formations having high downhole temperatures or in formations having brines exhibiting a high salt or hardness content.

In response to these shortcomings, additives are frequently included in conventional foams to enhance their performance as drilling fluids. For example, U.S. Pat. Nos. 4,013,568 and 4,039,459 teach the inclusion of a lignite additive to control lost circulation and an ammonium or alkali metal polyacrylate additive to increase the viscosity and cuttings-carrying ability of a conventional foam drilling fluid in high temperature applications. U.S. Pat. No. 4,088,583 teaches the inclusion of carboxyalkyl cellulose ethers and polyalkyleneoxide polymers additives to control lost circulation and stabilize a conventional foam drilling fluid in high temperature applications. U.S. Pat. No. 3,738,437 teaches a drilling process, wherein a fast-drilling, clear, low-density drilling fluid is utilized until enhanced mechanical stabilization or shale stabilization of the wellbore is required, at which time the low-density drilling fluid is converted to a high-density drilling mud. The low-density drilling fluid can be a liquid, gas, mist or foam as long as the fluid has a density and viscosity no greater than those of water. The low-density drilling fluid is converted to a drilling mud by suspending a prehydrated bentonite therein to mechanically stabilize the wellbore and further by adding a solution of partially hydrolyzed polyacrylamide and an alkali metal halide thereto to stabilize shale surrounding the wellbore.

Despite the teaching of such low-density drilling fluids in the prior art, a need remains for alternate stable and effective low-density drilling fluids. Accordingly, it is an object of the present invention to provide a drilling fluid that performs effectively in conventional drilling operations. It is a particular object of the present invention to provide a drilling fluid that effectively suspends and transports rock cuttings to the surface during a drilling operation. It is another object of the present invention to provide a drilling fluid that performs effectively in a wellbore under a broad range of subterranean conditions. It is a particular object of the present invention to provide a drilling fluid that performs effectively when drilling through a shale formation or a subterranean formation having a relatively low fracture or parting pressure gradient. It is another object of the present invention to effectively perform in a drilling operation without unduly damaging water sensitive formations. It is yet another object of the present invention to provide a drilling fluid that effectively performs as an "energized" drilling fluid to clean up drilling fluid invading the reservoir rock in reservoirs having relatively low fluid pressure. It is still another object of the present invention to provide a drilling fluid that is relatively stable under harsh formation conditions including the presence of crude oil, high temperatures, high salinity brines or high hardness brines. It is further an object of the present invention to provide such a drilling fluid that is cost effective, having practical economic utility in the field. It is still further an object of the present invention to provide a drilling process employing a drilling fluid that is chemically and operationally uncomplex. It is yet a further object of the present invention to provide a drilling fluid that is environmentally compatible and non-toxic.

SUMMARY OF THE INVENTION

The present invention is a process utilizing a specific polymer enhanced foam composition as a drilling fluid. The polymer enhanced foam is made up of a liquid phase and a gas phase. The liquid phase is an aqueous solvent having a substantially uncrosslinked acrylamide polymer and a surfactant dissolved therein. The polyacrylamide polymer is either a substantially unhydrolyzed polyacrylamide (PA) or a partially hydrolyzed polyacrylamide (PHPA). The gas phase is one of several known gasses that is relatively inexpensive and is dispersable within the liquid phase to form the foam. The surfactant uniformly disperses the gas phase throughout the liquid phase to form the foam, while the polymer imparts a desired degree of viscosity, structure, and stability to the foam. Consequently, the polymer enhanced foam displays satisfactory drilling fluid performance characteristics am a substantially reduced chemical cost and density relative to equivalent liquid compositions.

In accordance with the process of the present invention, a polymer enhanced foam having the above-described composition is prepared by premixing the liquid phase at the surface. The gas phase is then dispersed within the liquid phase to form the foam by one of two alternate sequences. In one sequence, the gas phase is combined with the liquid phase at the surface preforming a foam that is subsequently injected into the wellbore. In the other sequence, the gas phase is coinjected into the wellbore with the liquid phase and the gas phase and liquid phase are contacted in-line at the point of injection to form the foam proximal to the wellhead. Regardless of the particular sequence in which the foam is formulated, the resulting foam is employed as a drilling fluid in the wellbore in a conventional manner during the wellbore drilling operation to transport cuttings from the drilling face to the surface and to perform other functions normally expected of a drilling fluid.

The foam has specific utility in subterranean formations having a low fracture or parting pressure gradient insofar as the foam performs as an effective low-density drilling fluid without substantially fracturing or parting the formation as can occur with conventional water-based drilling fluids. The foam also has specific utility to water-sensitive shale formations and to reservoirs having relatively low fluid pressures which are amenable to energized drilling fluids. The foam is relatively insensitive to varied surface conditions during its formulation and likewise to severe downhole conditions encountered during the drilling operation including exposure to crude oil, high temperatures, high pressures, and high salinity or hardness brines. The process can often be practiced with conventional oilfield equipment. The foam and its constituents are compatible with the environment, being relatively noncorrosive and nontoxic to the operator and the environment. Accordingly, the present process and foam employed therein advantageously exhibit general utility to a broad range of drilling applications.

DESCRIPTION OF PREFERRED EMBODIMENTS

Figure 1A:
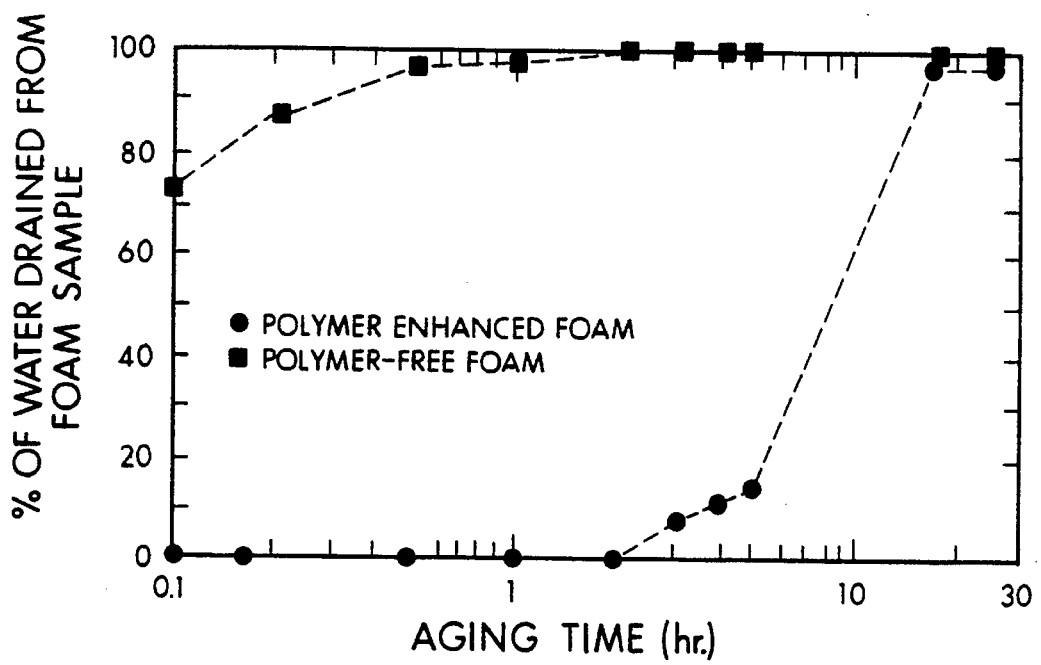
FIG. 1A is a graph comparing the rate of water drainage in a polymer enhanced foam of the present invention and a comparable conventional polymer-free foam as described in Example 1.

A number of specific terms are used throughout the specification to describe the process of the present invention and are defined as follows. A "formation" is a subterranean geological structure consisting essentially of "matrix," and in some instances, "anomalies." A "reservoir" is a hydrocarbon-bearing formation. An "anomaly" is a volume within a formation having a very high permeability relative to the matrix. The term "anomaly" is inclusive of such highly permeable volumes as fractures, fracture networks, joints, cracks, fissures, rugs, voids, solution channels, caverns, washouts, cavities, and the like. The "matrix" is generally characterized as substantially continuous, sedimentary geological material having a very low permeability relative to an anomaly. In addition, the matrix is often characterized as competent. The term "wellbore" is defined as a bore hole extending from the earth surface to a target hydrocarbon-bearing formation. Thus, a wellbore is a conduit providing fluid communication between the surface and the target formation. The term "well" is synonymous with the term "wellbore."

A "foam" is a stabilized dispersion of a gas phase maintained within a liquid phase. The foam is a plurality of gas bubbles separated from one another by the liquid phase.

Conventional oilfield foams consist of a gas phase dispersed within a liquid phase, wherein the liquid phase is a surfactant solution consisting of a surfactant and a solvent. The surfactant acts as a foaming agent to facilitate and stabilize the dispersion of the gas phase within the liquid phase. A "polymer enhanced foam" is a specific type of oilfield foam comprising a gas phase dispersed within a liquid phase, wherein the liquid phase is an aqueous solution having a surfactant and a polymer dissolved therein. Other terms used herein have the same definitions as ascribed to them in U.S. Pat. No. 5,129,457, incorporated herein by reference, or have definitions in accordance with the conventional usage of a skilled artisan, unless otherwise defined hereafter.

The process of the present invention is performed by generating and placing a specific polymer enhanced foam composition within a wellbore as the wellbore is being drilled through a subterranean formation as described hereafter. The liquid phase of the polymer enhanced foam comprises an aqueous solvent, a substantially uncrosslinked polymer, and a surfactant. The gas phase comprises an added gas. It is important to note that the foam composition is substantially free of any polymer crosslinking agent which could otherwise crosslink the polymer and convert the liquid phase of the foam to a crosslinked polymer gel at some point in the process.

The polymer component of the foam is a watersoluble, viscosity-enhancing acrylamide polymer that is substantially uncrosslinked. The acrylamide polymer is defined herein as polyacrylamide or partially hydrolyzed polyacrylamide. Polyacrylamide (PA) is an acrylamide homopolymer having substantially less than about 3% of its acrylamide groups converted to carboxylate groups. Partially hydrolyzed polyacrylamide (PHPA) is an acrylamide polymer having more than about 3%, but not 100%, of its acrylamide groups converted to carboxylate groups. It is noted that copolymers of acrylamide and acrylate are within the definition of PHPA as used herein. The acrylamide polymer is prepared according to any conventional method, but preferably has the specific properties of an acrylamide polymer prepared according to the method disclosed in U.S. Pat. No. Re. 32,114, incorporated herein by reference. The average molecular weight of an acrylamide polymer having utility herein is generally in a range between about 100,000 and about 30,000,000, and preferably between about 200,000 and about 25,000,000.

The aqueous solvent is substantially any aqueous liquid capable of forming a solution from the solvent, polymer, and surfactant. The term "solution" as used herein, in addition to true solutions, is intended to broadly encompass dispersions, emulsions, or any other homogeneous mixture of the solution components in the aqueous solvent. The solvent is preferably either a fresh water or a brine, such as sea water, well water, surface water, or produced water from a subterranean formation. In any case, the salt content of the resulting liquid phase is preferably less than about 100,000 ppm, preferably less than 50,000 ppm, and more preferably less than 10,000 ppm. The pH off the liquid phase is generally within a range or about 2 to about 10, and preferably within a range of 3 to 8.

The surfactant may be substantially any conventional anionic, cationic or nonionic surfactant which is distributed throughout the liquid medium to stabilize the interfaces between the liquid and gas phases. Anionic, cationic and nonionic surfactants are well known in general and are commercially available. Unlike conventional oilfield foams, the present foam has been found to be relatively insensitive to the chemistry of the employed surfactants. Specific surfactants having utility in the present invention include ethoxylated sulfates, ethoxylated alcohols, petroleum sulfonates, and alpha olefin sulfonates.

The gas of the gas phase may be substantially any gas that is substantially unreactive with the above-recited polymer, solvent and surfactant components and that is capable of being dispersed throughout the liquid phase. Examples of gasses having utility herein are air, nitrogen, methane, carbon dioxide, nitrous oxide, natural gas, produced gas and flue gas. Nitrogen or air is preferably used in the production of the present foams.

The foam is prepared by initially formulating the liquid phase at the surface for injection into the wellbore. The liquid phase is an injectable homogenous fluid admixture of the solvent, polymer, and surfactant. Surface admixing broadly encompasses batch mixing the components in bulk and subsequently injecting the liquid phase into the wellbore or simultaneously dynamically mixing the components in-line on the fly near the wellhead and injecting the liquid phase into the wellbore.

The polymer concentration of the liquid phase is generally at least about 500 ppm, preferably at least about 1,000 ppm, and most preferably within a range between about 2,000 ppm and about 100,000 ppm. The surfactant concentration in the liquid phase is about 10 ppm to about 50,000 ppm, preferably about 100 ppm to about 20,000 ppm, and most preferably about 200 ppm to about 10,000 ppm. Typically, the liquid phase is prepared by mixing discrete aqueous solutions of the polymer and surfactant.

Preparation of the foam proceeds by combining the gas phase with the liquid phase. The gas phase cain be combined with the liquid phase by conventional means such as sparging, high speed mixing, or simultaneously flowing the gas and liquid phases through one or more orifices, such as a screen or a plate, or through a solid packing, such as a sandpack or a gravel pack. The location and timing of the gas addition step can be at the surface prior to injection of the foam into the wellbore or at the surface simultaneous with coinjection of the liquid phase into the wellbore.

In general, the physical properties of the foam are a function of the specific foam components and their relative proportions. The volumetric gas content of the foam, termed foam quality, is expressed as the volume percent of gas in the foam. Foams having utility in the present process generally have a foam quality between about 20% and about 99%, preferably between about 50% and about 98%, and most preferably between about 60% and about 97%. The foam quality is selected within the limits set forth above as a function of the specific drilling environment in which the foam is employed. High strength foams are preferred when drilling through formations subject to lost circulation due to high permeability matrix or anomalies.

Foams are similarly created across a range of viscosities, stabilities, and densities by appropriate selection of the specific foam components and their relative proportions as is apparent to the skilled artisan in accordance with the instant teaching. The viscosity of the present foams can range from highly viscous to viscosities greater than, but approaching that of water. It is primarily the character of the polymer that contributes to the enhanced viscosity and stability of polymer enhanced foam. In general, the viscosity of a foam containing an acrylamide polymer is increased by increasing the polymer concentration of the liquid phase. However, an oftentimes more cost-effective and preferred means for achieving the same effect is to employ a higher molecular weight polymer at a relatively fixed concentration. Conversely, a reduction in the viscosity is achieved by using a lower molecular weight polymer. In any case, the foams are designed with a sufficient viscosity and structure to effectively suspend and transport rock cuttings to the surface during the drilling operation as well as to reduce leak off and formation damage. The foams are further designed to reduce sloughing and well bore collapse in water sensitive shale formations. Foams having utility in the present invention typically have a dynamic oscillatory viscosity at 1 radian per second between about 1 and about $1 \times 10^8$ cp, and preferably between about $5 \times 10^1$ and about $4 \times 10^6$ cp.

Relative to conventional oilfield foams, the present foam is significantly more stable over a wide range of temperatures, pressures, and formation water salinities and hardness. The foam is also highly stable in the presence of liquid hydrocarbons whereas conventional foams are not. It has further been found that foam, have advantageous drilling fluid performance characteristics relative to conventional liquid drilling fluids despite the presence of the added gas in the foams. Thus, it is apparent that the present foams can be tailored to meet the specific performance requirements of a given drilling operation, but at a substantially reduced chemical cost. The foams also have a substantially lower density and correspondingly a substantially lower hydrostatic pressure gradient than many conventional drilling fluids, rendering the foams advantageous in formations having a relatively low fracture or parting pressure gradient in formations sensitive to fracturing or parting by conventional aqueous drilling fluids. A relatively low fracture or parting pressure gradient is typically a pressure gradient below about 9.7 kPa/m. Foams having utility in the present invention, nevertheless, have a hydrostatic pressure gradient below the fracture or parting pressure gradient of the formation and also have a density between about 0.01 g/cm$^3$ and about 0.8 g/cm$^3$, preferably between about 0.02 g/cm$^3$ and about 0.5 g/cm$^3$, and most preferably between about 0.03 g/cm$^3$ and about 0.6 g/cm$^3$. The present foams are also advantageous in water-sensitive formations or in formations amenable to energized drilling fluids.

It is further noted that when a high permeability matrix, a high frequency of anomalies, or disproportionately large anomalies are encountered in formations through which the wellbore is being drilled, the foam is designed having a relatively high viscosity, structure and strength. When easily fractured formations, water-sensitive formations, or formations requiring highly energized drilling fluids for effective cleanup are encountered, the foam is designed with a relatively high foam quality.

Placement and circulation of the foam in a wellbore as a drilling fluid is performed in accordance with a conventional drilling operation, wherein the foam is continuously circulated through the wellbore during the drilling operation. The following examples demonstrate the practice and utility of the present invention, but are not to be construed as limiting the scope thereof.

EXAMPLE 1

A sample of a polymer enhanced foam and a sample of a conventional polymer-free foam are prepared to compare the stability, and in particular the resistance to physical foam collapse and water drainage, of the two foams. The liquid phase of both foams is made up of a fresh water solvent containing 1000 ppm of a $C_{12-15}$ ethoxylated sulfate surfactant. The liquid phase of the polymer enhanced foam, however, is further enhanced with an unhydrolyzed polyacrylamide at a concentration of 7000 ppm. The molecular weight of the polymer is 11,000,000.

The foam samples are prepared by coinjecting the liquid phase and a gas consisting of $N_2$ into a sandpack and flooding the fluids through the same sandpack. The sandpack has a permeability of 67 darcies, a length of 30 cm and a diameter of 1.1 cm. All foam generation is conducted at atmospheric back pressure with 170 kPa constant differential pressure across the sandpack. The polymer enhanced foam propagates at a frontal advance rate of 207 m/day and exhibits an average apparent effective viscosity within the sandpack of 89 cp, while the conventional foam propagates at a frontal advance rate of 8230 m/day and exhibits an average apparent effective viscosity of only 2 cp at the same differential pressure.

Figure 1B:
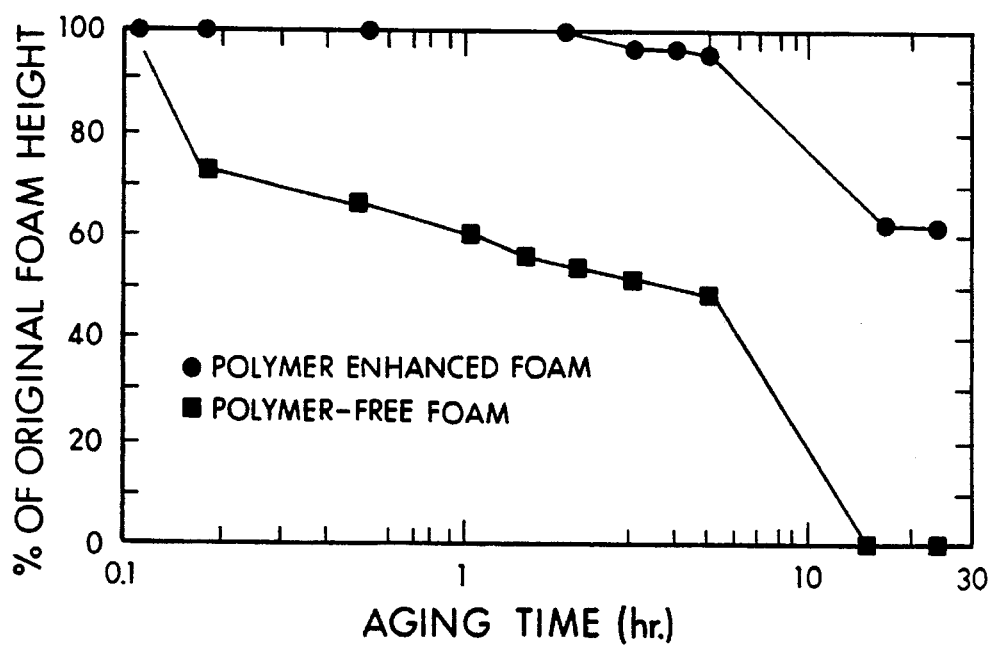
FIG. 1B is a graph comparing the rate of foam collapse in a polymer enhanced foam of the present invention and a comparable conventional polymer-free foam as described in Example 1.

A 100 cm$^3$ sample of each foam is collected as an effluent from the sandpack. Samples of both foams are fine-textured, with the polymer enhanced foam sample having a foam quality of 63% and the polymer-free foam sample having a foam quality of 68%. Each sample is placed in a stoppered graduated cylinder for aging at ambient temperature. The position of the foam/water and foam/air interfaces in the graduated cylinders are measured as a function of time to determine the rates of water drainage and foam collapse, respectively for each of the samples. The results are shown in FIGS. 1A and 1B, respectively. It is apparent therein that the rates of water drainage and foam collapse are much greater for a polymer-free foam than a polymer enhanced foam. Because the polymer enhanced foam is substantially more stable and viscous than a comparable conventional polymer-free foam, the polymer enhanced foam has predictably superior performance characteristics as a drilling fluid.

EXAMPLE 2

A series of polymer enhanced foam samples, differing only in the foam quality of each sample, are generated in a sandpack and flooded through the same sandpack to determine the relation between foam quality and apparent viscosity for the polymer enhanced foam of the present invention. The polymer enhanced foam samples are formulated from $N_2$ and a brine solvent containing a $C_{14-16}$ alpha olefin sulfonate surfactant at a concentration of 2000 ppm and a partially hydrolyzed polyacrylamide at a concentration of 7000 ppm. The partially hydrolyzed polyacrylamide has a molecular weight of 11,000,000 and is 30 mole % hydrolyzed. The sandpack has a length of 30 cm and a permeability of 150 darcies. All foam generation is conducted at atmospheric back pressure with 340 kPa constant differential pressure across the sandpack and the foam propagates at a frontal advance rate of about 150 m/day.

The results are set forth below in Table 1.

TABLE 1

| FOAM QUALITY (%) | AVERAGE APPARENT VISCOSITY (cp) |
| --- | --- |
| 0 | 150 |
| 57 | 190 |
| 63 | 200 |
| 74 | 210 |
| 80 | 230 |
| 85 | 230 |
| 89 | 240 |
| 93 | 240 |

The results show that the effective viscosity of the polymer enhanced foam is not unduly diminished as foam quality is increased and density is correspondingly decreased. Accordingly, the performance of the polymer enhanced foam as a drilling fluid is relatively insensitive to foam quality.

EXAMPLE 3

Samples of a polymer enhanced foam and samples of a corresponding unfoamed polymer solution free of any added gas are flooded through a sandpack to compare the effect of frontal advance rate and correspondingly shear thinning on the effective viscosities of the two compositions in the sandpack. The liquid phase of the foam samples consists of a synthetic brine solvent, 2000 ppm of a $C_{14-16}$ alpha olefin sulfonate surfactant, and 7000 ppm of a partially hydrolyzed polyacrylamide. The partially hydrolyzed polyacrylamide has a molecular weight of 11,000,000 and is 30 mole % hydrolyzed. The gas phase of the foam samples is nitrogen ($N_2$) and the foam quality ranges between about 77 and 89%. The composition of the unfoamed polymer solution samples is identical to the composition of the liquid phase of the foam samples.

Figure 2:
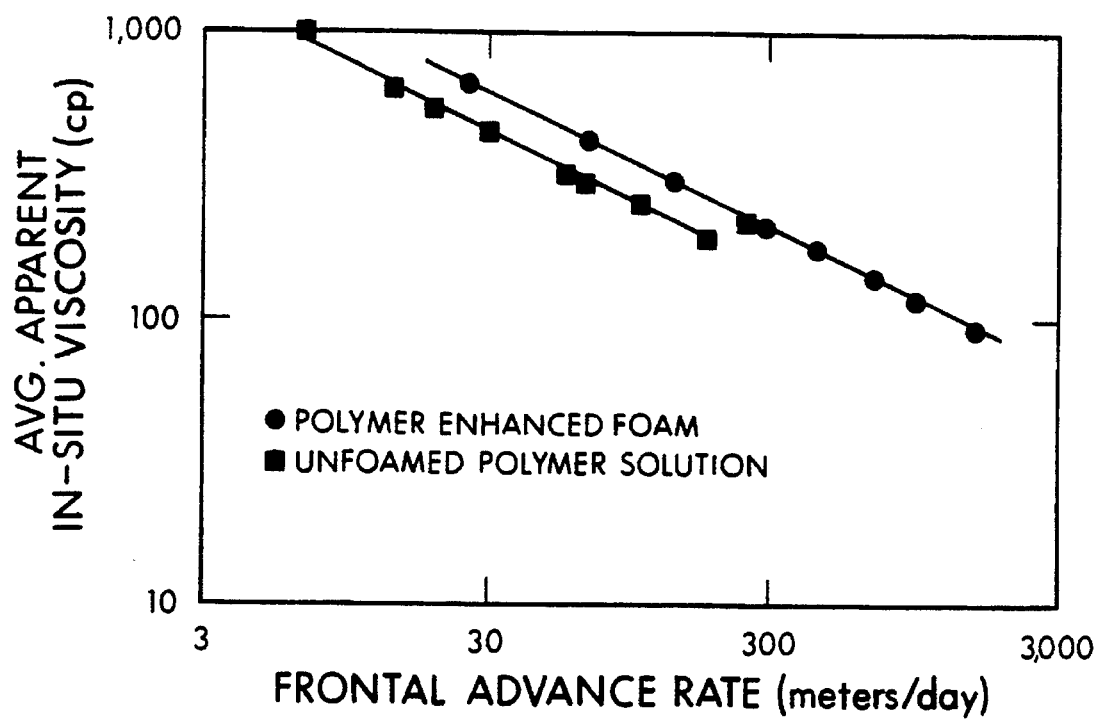
FIG. 2 is a graph comparing average apparent in situ viscosity as a function of frontal advance rate for a polymer enhanced foam of the present invention and an unfoamed polymer solution as described in Example 3.

The sandpack has a permeability of 169 darcies and a length of 30 cm. All samples of each composition are flooded through the sandpack at ambient temperature, atmospheric back pressure, and a constant differential pressure ranging between about 138 kPa and 1380 kPa across the sandpack. The frontal advance rates are measured as the samples are being produced. The average apparent in situ viscosity of each sample is measured and recorded as a function of the frontal advance rate. The comparative results of the functional relationship between effective viscosity and frontal advance rate for the two compositions are shown in FIG. 2.

It is noted that frontal advance rate is directly proportional to the shear rate experienced by the two fluid compositions. FIG. 2 indicates that both compositions are shear thinning. It is further apparent that the viscosity performance of the polymer enhanced foam is substantially similar to the viscosity performance of the polymer solution. Equivalent viscosity performance of the polymer enhanced foam, however, is achieved at a substantially reduced cost because a substantial portion of the foam is the gas phase which significantly reduces the cost of the foam relative to that of the comparable gas-free polymer solution. Insofar as polymer solutions are known to be effective drilling fluids, the instant results indicate hat the polymer enhanced foams of the present invention should likewise be effective drilling fluids.

EXAMPLE 4

Samples of a polymer enhanced foam are prepared in a foam-generating sandpack at a relatively high frontal advance rate and subsequently flooded through a separate test sandpack to study the effect of frontal advance rate and shear thinning on the average apparent in situ viscosities of the polymer enhanced foam in the rest sandpack. All foam generation is conducted at ambient temperature, constant differential pressure across the foam-generating sandpack, and an elevated injection pressure of about 3450 kPa.

The test sandpack is initially at 100% brine saturation and has a permeability of 120 darcies and a length of 30 cm. The composition of the preformed polymer enhanced foam samples is substantially the same as the foam samples of Example 3 except the foam quality ranges between about 81 and 89%. The preformed foam samples are displaced through the test sandpack and the average apparent in situ viscosity of each sample is measured and recorded as a function of the frontal advance rate. The functional relationship between average apparent in situ viscosity and frontal advance rate for the polymer enhanced foam is shown in FIG. 3.

Figure 3:
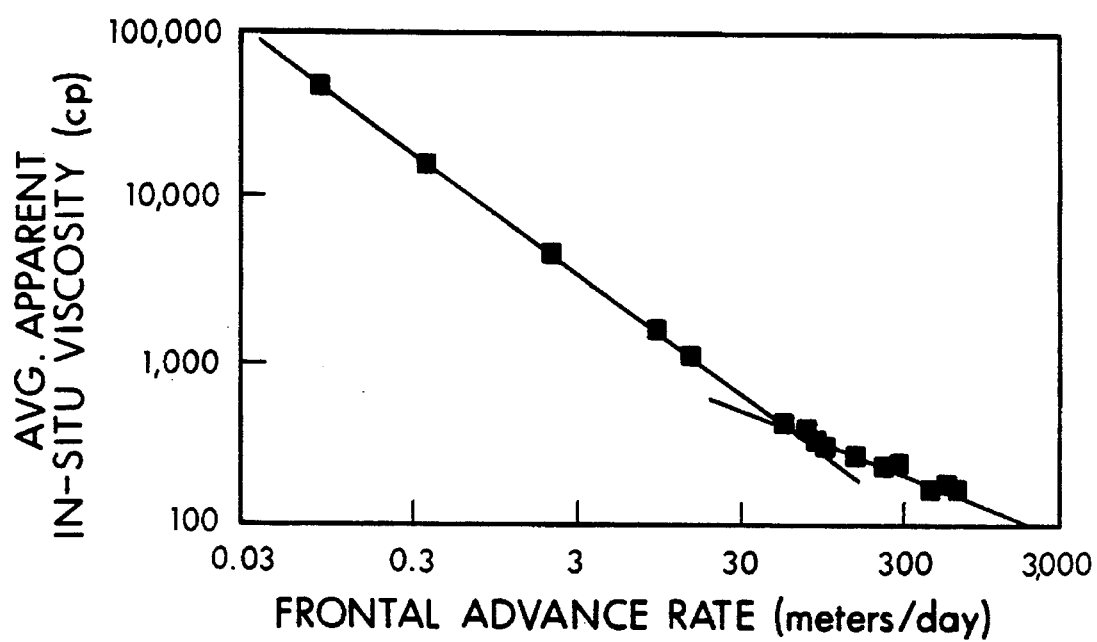
FIG. 3 is a graph showing average apparent in situ viscosity as a function of frontal advance rate for a preformed polymer enhanced foam of the present invention as described in Example 4 at an elevated pressure.

FIG. 3 indicates that the foam exhibits exceptionally high effective viscosities at low shear rates and elevated pressures, thereby enabling the production of high viscosity foams capable of performing effectively as drilling fluids. In particular, the foam demonstrates effective viscosities exceeding 50,000 cp that provide the foam with good proppant carrying power at low shear rates and high pressures.

Figure 4:
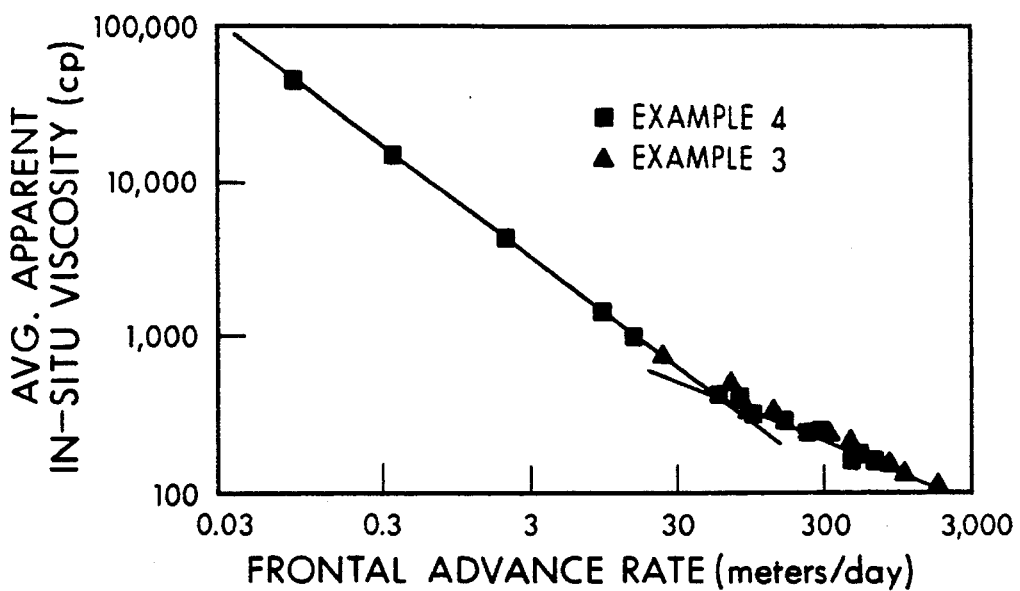
FIG. 4 is a graph showing the curve for the polymer enhanced foam of FIG. 2 superimposed onto the curve of FIG. 3.

In FIG. 4, the curve for the polymer enhanced foam samples of Example 3 is superimposed onto the curve for the samples of Example 4 to show the functional relationship between effective viscosity and frontal advance rate for the polymer enhanced foams at the different absolute pressures. The absolute pressure of the floods is increased from 97 kPa constant back pressure in Example 3 to 3450 kPa constant injection pressure in Example 4. FIG. 4 indicates that performance of the polymer enhanced foam of the present invention is not significantly effected by the increase in absolute pressure. Relative insensitivity to absolute pressure variations is an advantageous performance characteristic of an effective drilling fluid.

EXAMPLE 5

A development well is being drilled from an offshore platform to a target formation that is a semi-consolidated sandstone reservoir having a high clay content. The formation is at 3840 meters true vertical depth and has a temperature of 102° C. and a thickness of about 11.3 meters. The formation is often fractured or parted by conventional water-based drilling fluids, including polymer-based, non-weighted, water-based drilling fluids. When the formation fractures or parts during drilling operations, it often fractures out of the oil-producing interval into a lower water-producing interval to the detriment of subsequent oil production. The sandstone formation also has a relatively low fluid pressure with a history of poor cleanup capabilities for producing back non-energized drilling fluids that have invaded the near-wellbore formation rock.

The well is drilled with a conventional drilling mud to within about 33.5 meters from the top of the targeted formation at which point the drilling fluid is switched from the conventional drilling mud to the polymer enhanced foam of the present invention.

The polymer enhanced foam is prepared from nitrogen and from sea water, containing 8,500 ppm drilling-fluid grade PHPA and 2,000 ppm $C_{14-16}$ alpha olefin sulfonate surfactant and nitrogen. The PHPA is 30 mole % hydrolyzed and has a molecular weight of nominally 7,000,000. The resulting polymer enhanced foamed gel has an average foam quality within the wellbore of 72%. The well is successfully drilled through the targeted water-sensitive sandstone formation. The newly-drilled well is completed and placed in production at a satisfactory oil production rate. No significant fracturing or formation damage problems are encountered during or after the drilling operation and the drilling fluid readily cleans up from the near-wellbore environment.

EXAMPLE 6

A bulk polymer enhanced foam sample is generated in a sandpack, aged for five minutes and analyzed thereafter in a rheometer to demonstrate the bulk viscosity of the foam versus shear rate behavior. The polymer enhanced foam sample is formulated from $N_2$ and a brine solvent containing a $C_{14-16}$ alpha olefin sulfonate surfactant at a concentration of 2000 ppm and a partially hydrolyzed polyacrylamide at a concentration of 7000 ppm. The partially hydrolyzed polyacrylamide has a molecular weight of 11,000,000 and is 30 mole % hydrolyzed.

Figure 5:
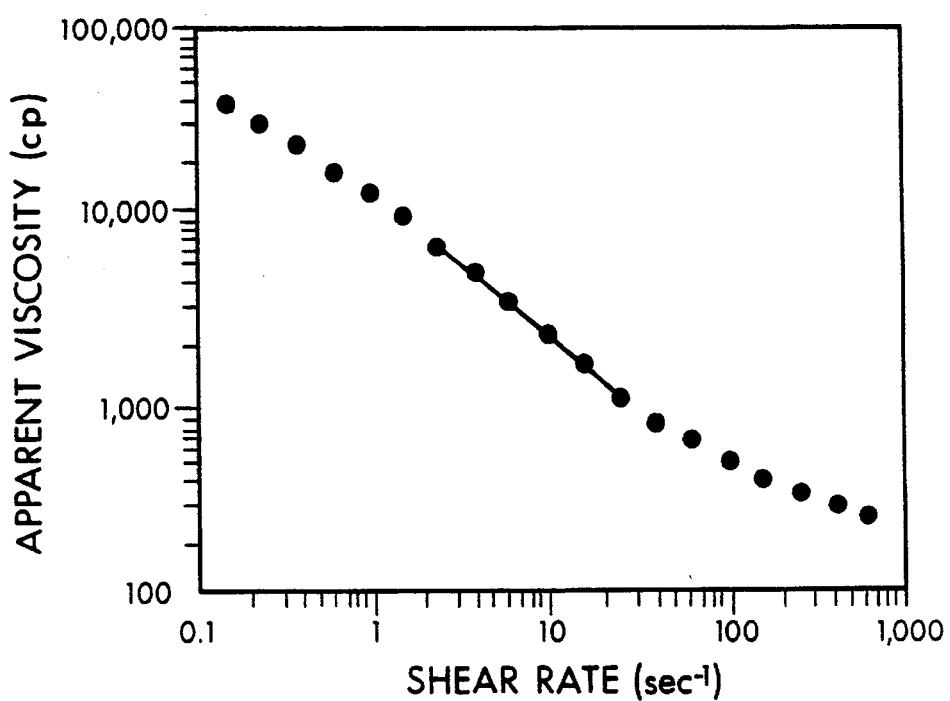
FIG. 5 is a graph showing apparent viscosity as a function of shear rate for a bulk sample of a polymer enhanced foam of the present invention as described in Example 7.

The results of the rheometric analysis shown in FIG. 5 indicate that the bulk sample of the polymer enhanced foam is a shear-thinning fluid over the broad range of shear rates studied, i.e., 0.15 to 700 sec_. The minimum measured viscosity is 250 cp and the maximum measured viscosity is over 40,000 cp, further indicating that the polymer enhanced foam of the present invention can exhibit very substantial bulk viscosities desirable of a drilling fluid.

While the foregoing preferred embodiments of the invention have been described and shown, it is understood that alternatives and modifications, such as those suggested and others, may be made thereto and fall within the scope of the present invention.

I claim:

1. A process for drilling a wellbore at a surface into a subterranean formation for production of hydrocarbons, the process comprising:

placing a polymer enhanced foam in a wellbore being drilled, wherein said polymer enhanced foam comprises a substantially uncrosslinked acrylamide polymer, a surfactant, an aqueous solvent, and an added gas; and circulating said foam through said wellbore as a drilling fluid to suspend rock cuttings from a drilling face and transport said rock cuttings to the surface.

2. The process of claim 1 wherein said surfactant is selected from a group consisting of ethoxylated sulfates, ethoxylated alcohols, petroleum sulfonates, and alpha olefin sulfonates.

3. The process of claim 1 wherein said polymer enhanced foam has a hydrostatic pressure gradient in said wellbore less than the fracture pressure gradient of said formation.

4. The process of claim 1 wherein said polymer has a molecular weight of at lease about 500,000.

5. The process of claim 1 wherein said polymer is partially hydrolyzed polyacrylamide.

6. The process of claim 1 wherein said polymer is polyacrylamide.

7. The process of claim 1 wherein said foam has a liquid phase consisting of said surfactant and said polymer in solution in said solvent and said liquid phase has a polymer concentration of at least about 2,000 ppm.

8. The process of claim 7 wherein said liquid phase has a salt concentration of less than about 10,000 ppm.

9. The process of claim 7 wherein said liquid phase has a pH between about 3 and about 8.

10. A process for drilling a wellbore at a surface into a subterranean formation for production of hydrocarbons, the process comprising:

placing a polymer enhanced foam in a wellbore being drilled, wherein said polymer enhanced foam comprises substantially uncrosslinked polyacrylamide, a surfactant, an aqueous solvent, and an added gas; and circulating said foam through said wellbore as a drilling fluid to suspend rock cuttings from a drilling face and transport said rock cuttings to the surface.

11. A process for drilling a wellbore at a surface into a subterranean formation for production of hydrocarbons, the process comprising:

placing a polymer enhanced foam in a wellbore being drilled, wherein said polymer enhanced foam comprises substantially uncrosslinked partially hydrolyzed polyacrylamide, a surfactant, an aqueous solvent, and an added gas; and circulating said foam through said wellbore as a drilling fluid to suspend rock cuttings from a drilling face and transport said rock cuttings to the surface.

* * * * *